United States Patent
Jing et al.

(10) Patent No.: US 9,424,338 B2
(45) Date of Patent: *Aug. 23, 2016

(54) CLUSTERING QUERIES FOR IMAGE SEARCH

(71) Applicant: Google Inc., Mountain View, CA (US)

(72) Inventors: Yushi Jing, Mountain View, CA (US); Michele Covell, Palo Alto, CA (US); Stephen C. Holiday, Brampton, CA (US)

(73) Assignee: Google Inc., Mountain View, CA (US)

( * ) Notice: Subject to any disclaimer, the term of this patent is extended or adjusted under 35 U.S.C. 154(b) by 6 days.

This patent is subject to a terminal disclaimer.

(21) Appl. No.: 14/264,411

(22) Filed: Apr. 29, 2014

(65) Prior Publication Data

US 2015/0169725 A1    Jun. 18, 2015

Related U.S. Application Data

(63) Continuation of application No. 13/482,343, filed on May 29, 2012, now Pat. No. 8,745,059.

(60) Provisional application No. 61/645,776, filed on May 11, 2012.

(51) Int. Cl.
*G06F 17/30* (2006.01)
*G06F 15/16* (2006.01)

(52) U.S. Cl.
CPC ...... *G06F 17/30598* (2013.01); *G06F 17/3028* (2013.01); *G06F 17/3053* (2013.01); *G06F 17/30256* (2013.01)

(58) Field of Classification Search
None
See application file for complete search history.

(56) References Cited

U.S. PATENT DOCUMENTS

| | | | |
|---|---|---|---|
| 6,718,063 B1 * | 4/2004 | Lennon et al. | 382/224 |
| 2005/0131951 A1 | 6/2005 | Zhang | |
| 2005/0165763 A1 | 7/2005 | Li | |
| 2006/0136455 A1 | 6/2006 | Wen | |
| 2007/0271226 A1 | 11/2007 | Zhang | |
| 2009/0070323 A1 | 3/2009 | Parikh | |
| 2009/0125510 A1 * | 5/2009 | Graham | G06F 17/30035 |
| 2009/0290812 A1 | 11/2009 | Naaman | |
| 2009/0313294 A1 | 12/2009 | Mei | |
| 2011/0179021 A1 | 7/2011 | Wen | |
| 2013/0024443 A1 | 1/2013 | Achuthan | |

OTHER PUBLICATIONS

U.S. Appl. No. 13/297,521, filed Nov. 16, 2011, 50 pages.
Office Action issued in U.S. Appl. No. 13/482,343 on Nov. 6, 2013, 14 pages.
Notice of Allowance issued in U.S. Appl. No. 13/482,343 on Mar. 12, 2014, 13 pages.

* cited by examiner

*Primary Examiner* — Alex Gofman
(74) *Attorney, Agent, or Firm* — Fish & Richardson P.C.

(57) ABSTRACT

Aspects of the subject matter described herein relate to functions used for retrieving image results based on search queries. More specifically, image search queries can be pre-grouped or classified based on visual and semantic similarity. For example, a pairwise image similarity value for a pair of queries can be computed based on one or more of the sum of all of the overlapping the image results, the sum of the image distances between all of the pairs of images in the image results, and the rank of each of the images in the image results. The pairwise image similarity values can then be used to generate image query clusters. Each image query clusters can include a set of queries with high pairwise image similarity values. In some examples, a distance function can be determined for each image query cluster. This data can be used to provide image results.

14 Claims, 5 Drawing Sheets

CLUSTERING QUERIES FOR IMAGE SEARCH

CROSS-REFERENCE TO RELATED APPLICATIONS

This application is a continuation of U.S. application Ser. No. 13/482,343, filed May 29, 2012, which claims the benefit of U.S. Provisional Patent Application No. 61/645,776 filed May 11, 2012, both of which are incorporated herein by reference.

BACKGROUND

The subject matter described herein generally relates to content serving systems that retrieve image results.

Various network-based search services provide users with content in response to a request for information including one or more query terms. Some search services may be dedicated to providing result lists of links or information about websites related to the one or more query terms. Other search services may provide result lists or links to images, maps, business listings, advertisements, or other information related to the one or more query terms. Still other systems may provide a combination of these. The results may be ranked and displayed in order of relevance as well as the quality of the resources, for example, the particular website associated with the result.

SUMMARY

One aspect of the subject matter described herein provides a method. The method includes accessing a plurality of image search queries. Each image search query of the plurality of image search queries includes one or more search terms submitted in requests for images. Each image search query of the plurality of image search queries is associated with image results previously provided in responses to requests for images. For each particular pair of image search queries, a processor determines a pairwise image similarity value indicative of a similarity between the image results of the particular pair of image search queries. The method also includes generating image query clusters based on the determined pairwise image similarity values, wherein the image query clusters include a set of two or more image search queries of the plurality of image search queries. The method also includes determining a distance function for each image query cluster.

In one example, determining the pairwise image similarity value for each particular pair of image search queries is based on an overlap value between the image results of the particular pair of image search queries. In another example, determining the pairwise image similarity value for each particular pair of image search queries is based on a sum of the image distances between the image results of the particular pair of image search queries. In yet another example, determining the pairwise image similarity value for each particular pair of image search queries is based on a sum of the ranked image distance between the image results of the particular pair of image search queries. In another example, determining the pairwise image similarity value for each particular pair of image search queries is based on the co-occurrence of the particular pair of image search queries as keywords for images in advertisements. In a further example, generating the image query clusters based on the determined pairwise image similarity values includes grouping image search queries that meet a threshold pairwise similarity value together into a query cluster. In another example, generating the image query clusters based on the determined pairwise image similarity values also includes performing hierarchical agglomerative clustering. In yet another example, generating the image query clusters based on the determined pairwise image similarity values also includes performing k-means clustering.

In another example, the method also includes associating each determined distance function with the respective image query cluster. In this example, the method can also include receiving, from a client device, a request for one or more images including one or more search terms; identifying an image query cluster of the generated image query clusters based on the one or more search terms of the received request; identifying a set of search results based on the distance function associated with the identified image query cluster; and sending the set of search results to the client device.

Another aspect of the subject matter described herein provides a system. The system includes memory storing a plurality of image search queries. Each image search query of the plurality of image search queries includes one or more search terms submitted in requests for images. Each image search query of the plurality of image search queries is associated with image results previously provided in responses to requests for images. The system also includes a processor coupled to the memory. The processor is configured to, for each particular pair of image search queries, determine a pairwise image similarity value indicative of a similarity between the image results of the particular pair of image search queries. The processor is also configured to generate image query clusters based on the determined pairwise image similarity values, wherein the image query clusters include a set of two or more image search queries. The processor is configured to determine a distance function for each image query cluster.

In one example, the processor is also configured to determine the pairwise image similarity value for each particular pair of image search queries based on an overlap value between the image results of the particular pair of image search queries. In another example, the processor is configured to determine the pairwise image similarity value for each particular pair of image search queries based on a sum of the image distances between the image results of the particular pair of image search queries. In yet another example, the processor is configured to determine the pairwise image similarity value for each particular pair of image search queries based on a sum of the ranked image distance between the image results of the particular pair of image search queries. In another example, the processor is configured to determine the pairwise image similarity value for each particular pair of image search queries based on the co-occurrence of the particular pair of image search queries as keywords for images in advertisements. In a further example, the processor is configured to generate the image query clusters based on the determined pairwise image similarity values by performing hierarchical agglomerative clustering. In still a further example, the processor is configured to generate the image query clusters based on the determined pairwise image similarity values by performing k-means clustering.

In another example, the processor is also configured to associate each determined distance function with the respective image query cluster.

Yet another aspect of the subject matter described herein provides a tangible computer-readable storage medium on which computer readable instructions of a program are stored. The instructions, when executed by a processor, cause the processor to perform a method. The method includes accessing a plurality of image search queries. Each image search query of the plurality of image search queries includes one or more search terms submitted in requests for images. Each image search query of the plurality of image search queries is associated with image results previously provided in responses to requests for images. The method also includes, for each particular pair of image search queries, determining a pairwise image similarity value indicative of a similarity between the image results of the particular pair of image search queries. The method includes generating image query clusters based on the determined pairwise image similarity values, wherein the image query clusters include a set of two or more image search queries of the plurality of image search queries. The method also includes determining a distance function for each image query cluster.

In one example, determining the pairwise image similarity value for each particular pair of image search queries is based on an overlap value between the image results of the particular pair of image search queries. In another example, determining the pairwise image similarity value for each particular pair of image search queries is based on a sum of the image distances between the image results of the particular pair of image search queries. In yet another example, determining the pairwise image similarity value for each particular pair of image search queries is based on a sum of the ranked image distance between the image results of the particular pair of image search queries. In another example, the method further includes determining the pairwise image similarity value for each particular pair of image search queries based on the co-occurrence of the particular pair of image search queries as keywords for images in advertisements. In a further example, the method further includes associating each determined distance function with the respective image query cluster.

DETAILED DESCRIPTION

In one example, multiple search queries can be accessed. The search queries can have been submitted by devices in a request for one or more images. Each query can include search terms and associated image results. For example, the image results can include data previously provided to a requesting device to be displayed to a user.

For each pair of queries, the server can compute a pairwise image similarity value. As described in more detail below, this value can be based on the percentage of overlapping images between the image results of the pair, the sum of the image distances between the image results of the pair, and/or the sum of the ranked image distance between the image results of the pair. The server can then generate image query clusters based on the pairwise image similarity values. For example, queries with high pairwise image similarity values can be grouped together into an image query cluster.

In some examples, a distance function can be determined for each image query cluster. The image query clusters and respective distance functions can be associated with one another and stored for later use by this or another server.

The stored data can be used by a server to provide image results. For example, the server can receive, from a client device, a request for one or more images including search terms. The server can identify an image query cluster based on the search terms of the received query. The server can identify image results based on the distance function associated with the identified query cluster. The server can then sending the image results to the requesting client device for display to a user.

Figure 1:
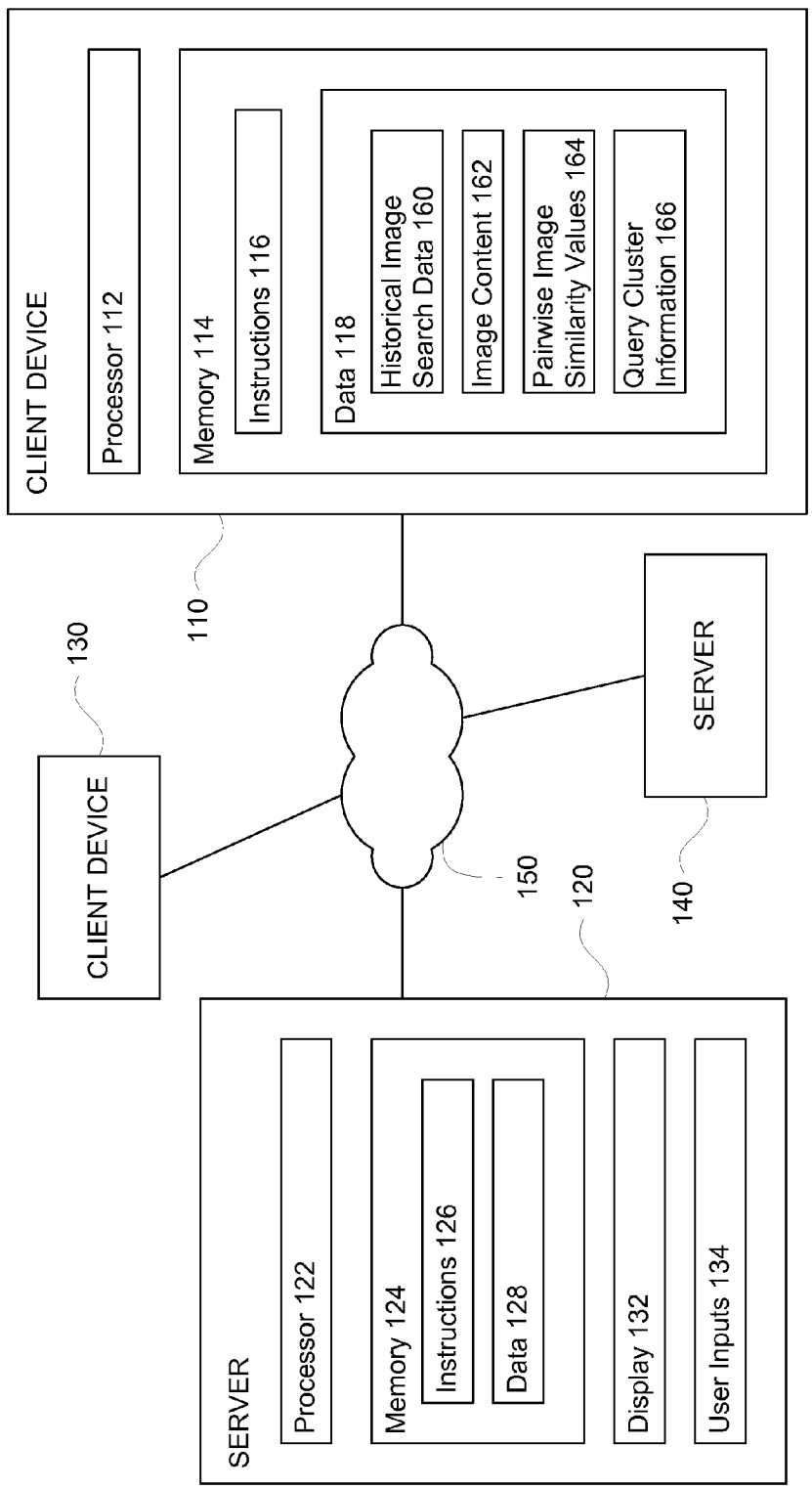
FIG. 1 is a functional diagram of a system in accordance with aspects of the subject matter described herein.
Figure 2:
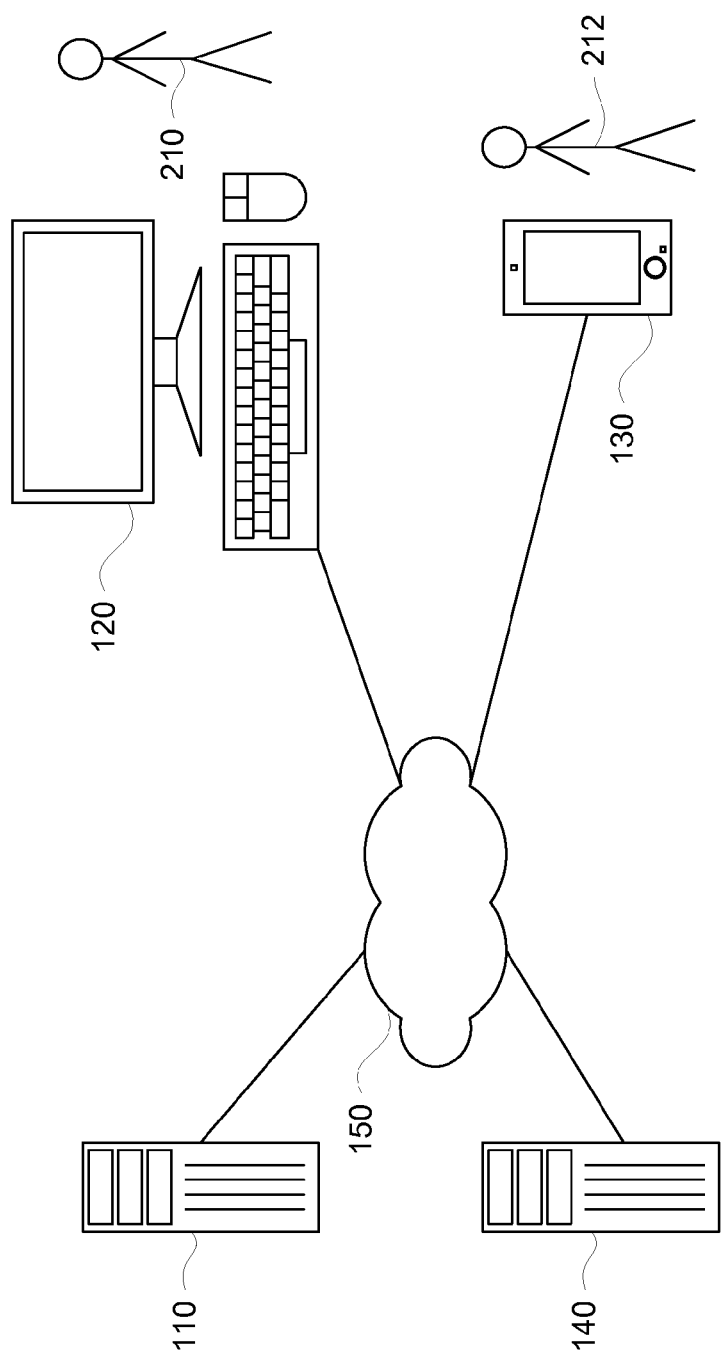
FIG. 2 is a pictorial diagram of the system of FIG. 1.
Figure 3:
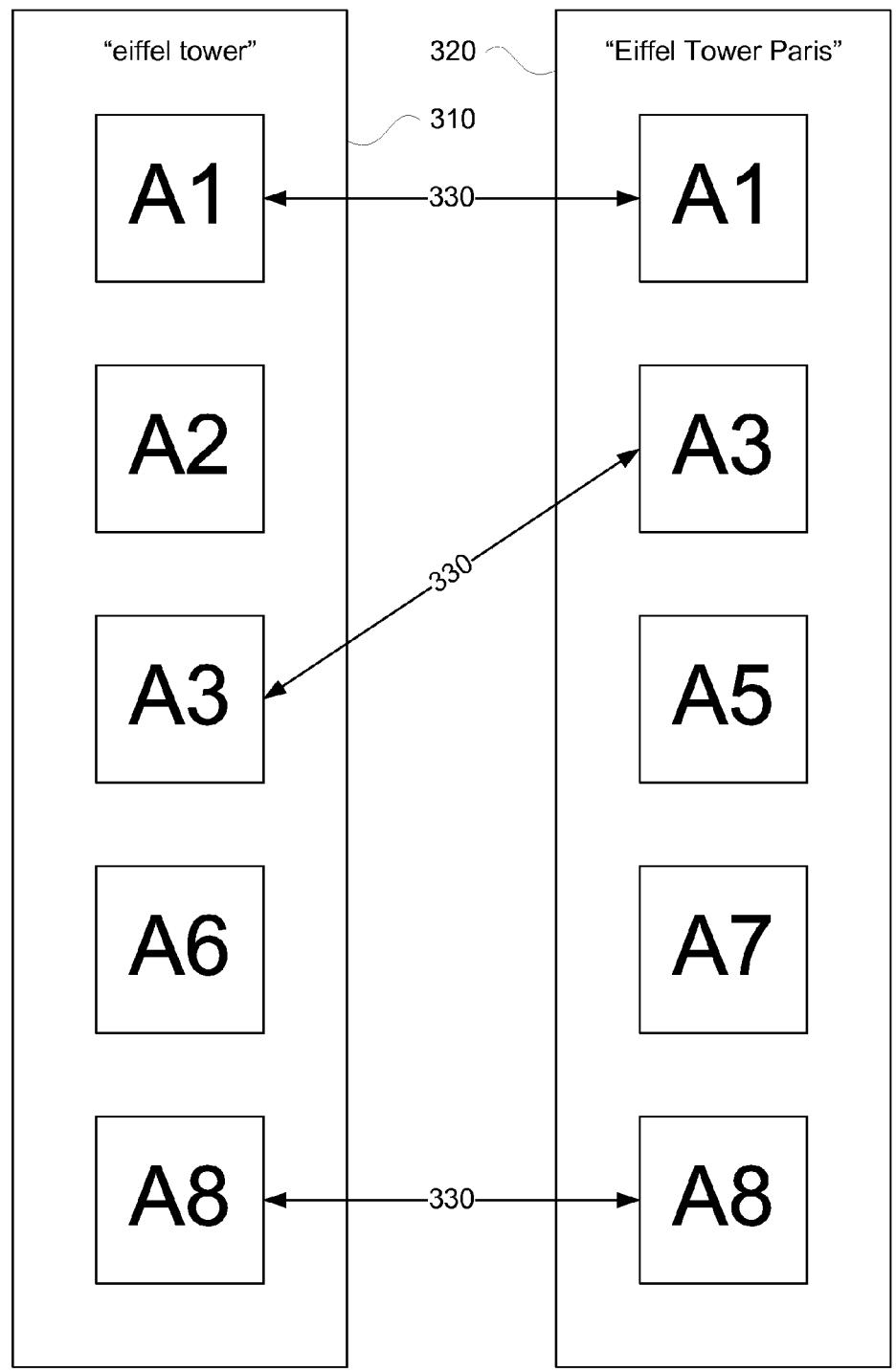
FIG. 3 is a diagram of example data in accordance with aspects of the subject matter described herein.

In one example, shown in FIGS. 1 and 2, an example system 100 can include computers 110, 120, 130, and 140. Computer 110 can contain a processor 112, memory 114 and other components typically present in general purpose computers. Memory 114 of computer 110 can store information accessible by processor 112, including instructions 116 that can be executed by the processor 112.

Memory can also include data 118 that can be retrieved, manipulated or stored by the processor. The memory can be of any type capable of storing information accessible by the processor, such as a hard-drive, memory card, ROM, RAM, DVD, CD-ROM, write-capable, and read-only memories.

The instructions 116 can be any set of instructions to be executed directly, such as machine code, or indirectly, such as scripts, by the processor. In that regard, the terms "instructions," "application," "steps" and "programs" can be used interchangeably herein. The instructions can be stored in object code format for direct processing by the processor, or in any other computer language including scripts or collections of independent source code modules that are interpreted on demand or compiled in advance. Functions, methods and routines of the instructions are explained in more detail below.

Data 118 can be retrieved, stored or modified by processor 112 in accordance with the instructions 116. For instance, although the system and method is not limited by any particular data structure, the data can be stored in computer registers, in a relational database as a table having a plurality of different fields and records, or XML documents. The data can also be formatted in any computer-readable format such as, but not limited to, binary values, ASCII or Unicode. Moreover, the data can include any information sufficient to identify the relevant information, such as numbers, descriptive text, proprietary codes, pointers, references to data stored in other memories, including memories at other network locations, or information that is used by a function to calculate the relevant data.

The processor 112 can be any conventional processor, such as commercially available CPUs. Alternatively, the processor can be a dedicated device such as an ASIC or other hardware-based processor. Although FIG. 1 functionally illustrates the processor, memory, and other elements of computer 110 as being within the same block, it will be understood by those of ordinary skill in the art that the processor, computer, or memory can actually include multiple processors, computers, or memories that can or cannot be stored within the same physical housing. For example, memory can be a hard drive or other storage media located in a housing different from that of computer 110. Accordingly, references to a processor, computer, or memory will be understood to include references to a collection of processors, computers, or memories that can or cannot operate in parallel.

The computer 110 can be at one node of a network 150 and capable of directly and indirectly communicating with other nodes, such as computers 120, 130, and 140 of the network. The network 150 and intervening nodes described herein, can be interconnected using various protocols and systems, such that each can be part of the Internet, World Wide Web, specific intranets, wide area networks, or local networks. These can use standard communications protocols or those proprietary to one or more companies, Ethernet, WiFi and HTTP, and various combinations of the foregoing.

Computers 110 and 140 can be web servers capable of communicating with client devices 120, 130. For example, in response to a request originating from client devices 120 or 130, the servers 110 and 140 can send information such as images and related content to the client devices for display to a user such as users 210 or 212, shown in FIG. 2.

Servers 110 and 140 can be the same or different computing devices. In one example, server 110 or 140 can be an image serving server which provides images search results to client devices requesting this information. The image results can include, for example, an actual image, a modified version of an image, e.g. a thumbnail version, content related to the image, a network location, or other information which can be used to retrieve the image. In another example, server 110 can process data as described herein and provide the results of the processing to another server, such as server 140, so that server 140 can use the results when serving image results to client devices. Servers 110 and/or 140 can also include a plurality of computers, e.g., a load balanced server farm, that exchange information with different nodes of a network for the purpose of receiving, processing, and transmitting data to the client devices. In this instance, the client devices will typically still be at different nodes of the network than any of the computers comprising servers 110 or 140.

Each of client devices 120, 130 can be configured similarly to the server 110, with a processor 122, memory 124, instructions 126, and data 128, similar to processor 112, memory 114, instructions 116, and data 118. Each client device 120, 130 can be a personal computer, intended for use by a user 210, 212, having all the components normally found in a personal computer such as a central processing unit 122 (CPU), display device 132, CD-ROM, hard-drive, user inputs 134, speakers, modem and/or network interface device and all of the components used for connecting these elements to one another. The display device 132 can be, for example, a monitor having a screen, a projector, a touch-screen, a small LCD screen, a television, or another device such as an electrical device that is operable to display information processed by the processor. The user inputs 134 may include, for example, one or more of a mouse, keyboard, touch-screen or microphone. Moreover, computers in accordance with the systems and methods described herein can be any device capable of processing instructions and transmitting data to and from humans and other computers including general purpose computers, PDAs, network computers lacking local storage capability, set-top boxes for televisions, and other networked devices.

Although the computers 120, 130 can be full-sized personal computers, the subject matter described herein can also be used in connection with mobile devices capable of wirelessly exchanging data with a server over a network such as the Internet. By way of example only, client device 130 can be a wireless-enabled PDA, hand-held or in-car navigation device, tablet PC, netbook, or a cellular phone capable of obtaining information over the Internet. The user can input information, for example, using a small keyboard, a keypad, or a touch screen.

Although certain advantages are obtained when information is transmitted or received as noted above, other aspects of the subject matter described herein are not limited to any particular manner of transmission of information. For example, in some aspects, information can be sent using a medium such as a disk, tape or CD-ROM. Yet further, although some functions are indicated as taking place on a single computer having a single processor, various aspects of the system and method can be implemented by a plurality of computers, for example, communicating information over network 150.

Returning to FIG. 1, data 118 of server 110 can include historical image search data 160. The historical image search data 160 can include information such as queries received by an image serving server, image results, e.g., the search results served in response to those queries, and information about the interaction of users. For example, a particular query can include one or more search terms used by an image serving server to identify relevant and interesting image results. A query can also be associated with date and time information, a set of image results, and information indicating which of the image results were selected or clicked.

The historical image search data 160 can also include a matrix, database, array, table, etc., of co-selected image values. For example, in a single query, if the set of selected image results for the particular query includes two or more search results, these image results can be "co-selected" images for the particular query. In other words, given a single search for the query "Eiffel Tower," if two or more of the image results were selected, these two or more image results are "co-selected." This information can be used to generate the co-selected image values. For example, the image results for a plurality of queries that include the search terms "Eiffel Tower" can be examined to identify all of the selected images. The rates at which each particular pair of images was selected from the image results for "Eiffel Tower" can then be used to generate a co-selection value for the particular image pair. This may be repeated until each co-selected image pair for the query "Eiffel Tower" is assigned a co-selection value.

The data 118 can also include a source of image content 162. For example, the image content 162 can be the images and information used by an image serving server to provide image results in response to a query. This data can include, but is not limited to, web pages, image databases, and other content databases including images. In this regard, the image content 162 can be stored locally at server 110 or server 140 or at a plurality of different nodes of network 150.

At least some of the image content can be associated with annotation information. The annotation information can also be used by the image server to provide image results in response to a query. This annotation information can include details about the images such as titles, descriptions, ratings, sources for the images, geographic locations at which the images were captured, and other data provided by or from various sources. In some examples, the annotation information can be provided by web page administrators, the provider of the image, or third parties.

In addition to annotation information, at least some of the images can be associated with advertising information. For example, some images can be associated with keywords identified by an advertiser when generating an advertising campaign. In this example, when an advertiser provides, identifies, or otherwise selects an image to be displayed with an advertisement, the advertiser can also identify by inputting manually or select, for example, from a list, one or more keywords. Such a keyword, when entered by a user, can trigger the display of the advertisement and the image. These keywords and the number of times they are identified or selected for use with a particular image can be associated with the particular image of the image content.

The server 110 can also have access to pairwise image similarity values 164. As described in more detail below, these values can indicate the similarity between two images of the image content 162.

Data 118 can also include image query cluster information 166. The image query cluster information can include clusters of queries which are determined to be similar based on the pairwise image similarities of the respective image results. In this regard, each cluster can include a set of two or more queries. Each cluster can also be associated with a distance function which can be used to identify relevant and interesting image results for the queries of the image query cluster.

In addition to the operations described below and illustrated in the figures, various operations will now be described. It should also be understood that the following operations do not have to be performed in the precise order described below. Rather, various steps can be handled in a different order or simultaneously. Steps can also be omitted unless otherwise stated.

The server can select queries of the historical search data 160 for processing. For example for each particular query, the server can identify a "candidate query" based on annotations of the images. First, the server can find all of the images that are annotated with the particular query. Second, the server collects all of the queries, other than the particular query, that are also annotations of these images. The collected queries can be sorted based on occurrence or the number of times the query appears in the annotations for the images and selected for processing.

The server 110 can compute the pairwise image similarities between two selected queries. For example, the server can analyze the overlap between the image results produced by these queries. For example, if the query "eiffel tower" and the query "Eiffel Tower Paris" share very similar image results, then these queries are likely to represent similar "visual" concepts. Based on these similar concepts, the server 110 can determine the pairwise image similarity value.

The pairwise image similarity value between two queries can be based on the percentage of overlapping images between the image results produced by each of the two queries. In one example depicted graphically in FIG. 4, running the query "eiffel tower" can result in image results 310, including images A1, A2, A3, A5, and A8. In this example, running the query "Eiffel Tower Paris" can result in image results 320, including images A1, A3, A6, A7, and A8. The pairwise image similarity value between these two queries can be based on the overlap, shown by relationship lines 330, of A1, A3, and A8. In this example, the pairwise image similarity value can be 0.6 or 60%.

The pairwise image similarity value between two queries can also be based on the sum of the image distances between all of the pairs of images in the image results produced by each of the two queries. The image distance (d) can be calculated by comparing images at the pixel level. This can include color, brightness, texture, edge location, and other visual information for the compared images. In one example, if the query "eiffel tower" produces images X1 and X2, and the query "eiffel tower Paris" produces images Y1 and Y2, the pairwise image similarity value for these two queries can be: $[d(X1, Y1)+d(X1, Y2)+d(X2, Y1)+d(X2, Y2)]/Z$. In this example, $d(X1, Y1)$ represents the distance between image X1 and image Y1, $d(X1, Y2)$ represents the distance between image X1 and image Y2, $d(X2, Y1)$ represents the function between image X2 and image Y1, and $d(X2, Y2)$ represents the distance between image X2 and image Y2. In addition, Z is a normalization constant. In this regard the pairwise image similarity value can consider the distance between each pairing of images included in the search results produced by the queries.

The pairwise image similarity value between two queries can also be based on the rank of each of the images in the image results produced by each of the two queries. In one example, if the query "eiffel tower" produces images X1 and X2, and the query "eiffel tower Paris" produces images Y1 and Y2, the pairwise image similarity value for these two queries can be: $\{[Rank(X1)+Rank(Y1)]*d(X1,Y1)+[Rank(X1)+Rank(Y2)]*d(X1,Y2)+[Rank(X2)+Rank(Y1)]*d(X2,Y1)+[Rank(X2)+Rank(Y2)]*d(X2,Y2)\}/Z$.

In this example, $Rank(X1)$ is the rank of the image X1 when provided in response to the query "eiffel tower," and $Rank(X2)$ is the rank of the image X2 when provided in response to the query "eiffel tower." Similarly, $Rank(Y1)$ is the rank of the image Y1 when provided in response to the query "eiffel tower Paris," and $Rank(Y2)$ is the rank of the image Y2 when provided in response to the query "eiffel tower Paris." As with the above example, $d(X1, Y1)$ represents the distance between image X1 and image Y1, $d(X1, Y2)$ represents the distance between image X1 and image Y2, $d(X2, Y1)$ represents the distance between image X2 and image Y1, and $d(X2, Y2)$ represents the distance between from image X2 and image Y2. Again, in this example, Z is also a normalization constant.

The pairwise image similarity value between two queries can also be based on the co-occurrence of the queries as keywords for images in advertisements. For example, if queries X and Y are both keywords of the same advertising image, the pairwise image similarity value between the two queries can be increased by some value V, for example, 1 or 0.1, etc. If X and Y occur in the same group of keywords or associated with the same image for a number of images of Z, the pairwise image similarity value for these two queries can be: $Z*V$. Thus, if $V=1$, the pairwise similarity value for X, Y can be Z.

The server can determine the pairwise image similarity value for each pair of queries in a variety of ways, including any combination of the examples described above. For example, when calculating a pairwise image similarity value between two queries, the server can consider one or more of the sum of all the overlapping image results, the sum of the image distances between all of the pairs of images in the image results produced by each of the two queries, and the rank of each of the images in the image results produced by each of the two queries.

Once the server has computed the pairwise image similarity values for a plurality of queries, the server can generate query clusters. The query clusters can include a set of queries with pairwise image similarity values that have met, for example are greater than or equal to, some minimum threshold pairwise similarity value. This minimum threshold pairwise similarity value can be dependent upon the historical image search data and can be calibrated using a set of training data. This clustering can involve standard clustering techniques such as hierarchical agglomerative clustering or K-means clustering. For example, a query cluster can include the queries "eiffel tower" and "Eiffel Tower Paris". These two queries can have a high pairwise image similarity value. If the query "paris" has a high pairwise image similarity value with regard to "eiffel tower" and "Eiffel Tower Paris" it can also be included in this query cluster. Similarly, if the query "paris" has a low pairwise image similarity value with regard to "eiffel tower" and "Eiffel Tower Paris" it cannot be included in this query cluster.

By grouping images with pairwise image similarity values that meet the threshold pairwise similarity value, the image query clusters will include queries that are contextually related. In other words, the grouped images will have similar or related image results, contexts, ideas, meanings, etc. Thus, each query cluster can be used to determine a specific distance function. The result is a plurality of distance functions which are specific to the context of the queries of the respective image query cluster.

Though other methods can also be used, in one example, a server, such as server 110, server 140, or another server, can access all of the historical image search data for all of the queries of a particular image query cluster. Using this data, a reference image and a set of secondary images can be selected. For example, a reference image for a particular query cluster can be any image that was selected in response to receiving any of the search results for any of the queries of the particular query cluster.

The set of secondary images can be selected based on a number of different heuristics. In one example, a first secondary image can be an image that has a rank that is lower than that of the rank of the reference image in any of the image results for all of the queries of the particular query cluster. In another example, a first secondary image can be selected such that the co-selection value between the reference image and the first secondary image is greater than some pre-specified minimum co-selection value threshold. For example, if the co-selection values are provided on a scale of 0.0 to 1.0, where 1.0 indicates a high co-selection rate, the minimum co-selection value threshold can be between 0.0 and 1.0, or 0.6.

A second secondary image can then be selected using similar heuristics as those described with the first secondary image. For example, the second secondary image can be an image that has a rank that is lower than that of the rank of the first secondary image in any of the image results for all of the queries of the particular query cluster. In another example, the second secondary image can be selected such that the co-selection value between the first secondary image and the second secondary image is greater than the pre-specified minimum co-selection value threshold described above.

The reference image and the set of secondary images can be used to determine or train a distance function for each particular image query cluster. For example, a distance function can be determined using a machine learning process that iteratively analyzes visual distances between the reference image and the images of the set of secondary images. This may be repeated until each image that was selected in response to receiving any of the search results for any of the queries of the particular query cluster is used as the reference image. The result can include a vector of values in which each value is indicative of a relative importance or weight of an image feature in relation to the context of the query. Referring to the example above, with regard to the query "apple," the color can relatively important to differentiate between images and thus, this feature can be given more weight than other image features. For the query "tree", shape or edge can be more important because almost all trees are green and thus, this feature can be given more weight than color.

In this example, the distance function can satisfy the equation:

$$d_t(x_i, x_j) = \sqrt{\sum_{m=1}^{M} W_t^m (x_i^m - x_j^m)^2}.$$

In one example, $x_i^m$ is the image feature value of the image feature for the reference image $x_i$, $x_j^m$ is the image feature value of the image feature m for the reference image $x_j$, M is a feature dimension in the set of image feature values, $d_t(x_i, x_j)$ is the image distance between image $x_i$ and $x_j$, $w_t^m$ is the weight value of the distance function for the image feature m, and $x_m^t$ is the value of the image profile for the image feature m.

The server can determine the distance functions as described above until each image query cluster is associated with a specific distance function. The image query clusters and distance functions can then be stored as described above in order to serve image results. For example, a server, such as server 110, server 140, or another server, can receive a request for one or more images including one or more query terms from a client device. The server can identify an image query cluster based on the one or more query terms. The server can then use the distance function associated with the identified image query cluster to identify image results. For example, given a query cluster including queries such as "apples" or "fuji apple," the color of object can be more important to differentiate between images whereas for the query cluster including queries "clump of trees" or "grove of trees", perhaps shape is more important because almost all trees are green. The distance functions may allow a server to use such information to provide image results. If there the terms of the query are not included in any particular image query cluster, a default, generic distance function can be used to identify image results. In another example, the one or more query terms can be used to identify an image query cluster with queries having similar terms. Again, the server can use the distance function associated with the identified image query cluster to identify image results. The server can transmit the image results to the requesting client device.

Figure 4A:
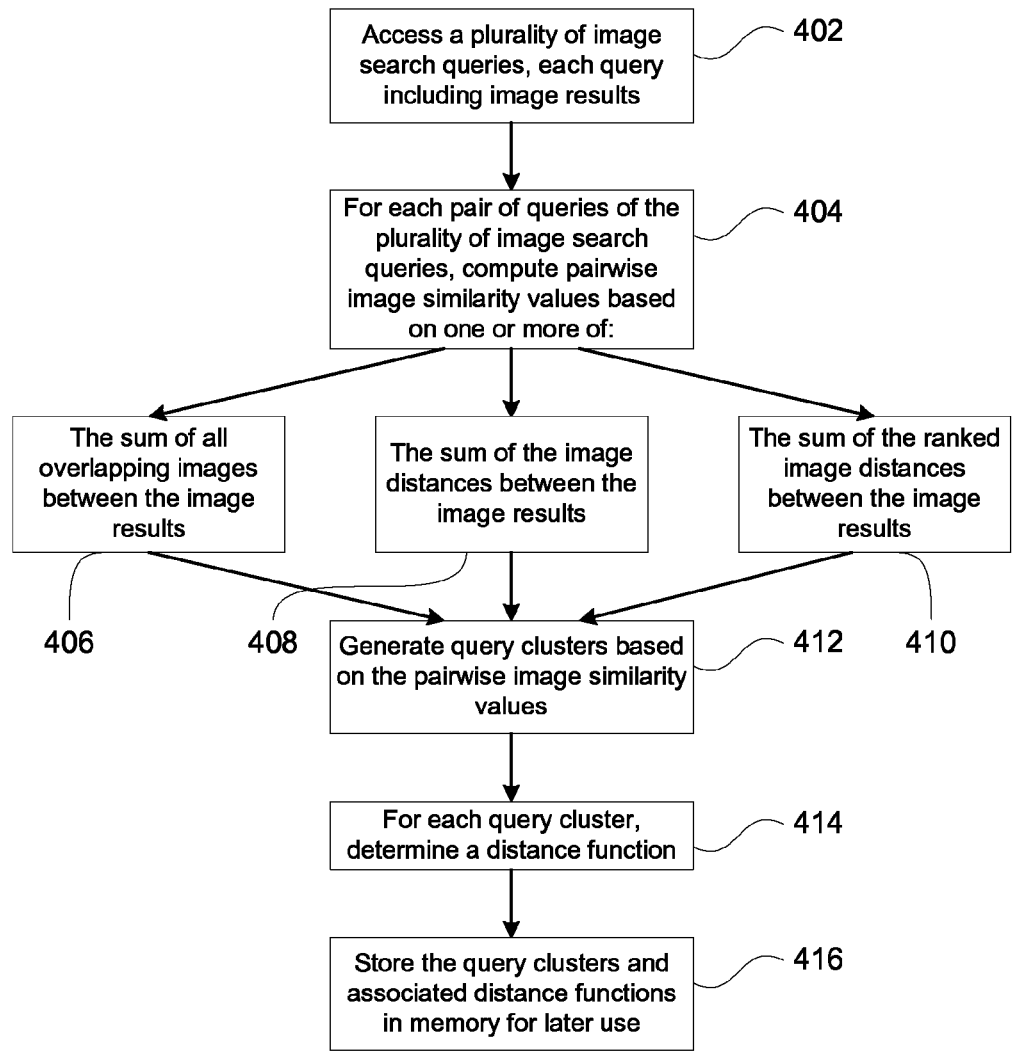
FIGS. 4A and 4B are flow diagrams in accordance with aspects of the subject matter described herein.

Flow diagram 400A of FIG. 4A depicts an example of some of the aspects described above. In this example, at block 402, a server accesses a plurality of image search queries. Each query of the search queries includes search terms and associated image results, for example, previously provided to a requesting device to be displayed to a user. At block 404, for each pair of queries, the server computes the pairwise image similarity values. This can be based on one or more of the features of blocks 406, 408, and 410. For example, the pairwise image similarity values can be based on at least one or more of the percentage of overlapping images between the image results at block 406, the sum of the image distances between the image results at block 408, and the sum of the ranked image distance between the image results at block 410. The server then generates image query clusters based on the pairwise image similarity values at block 412. For example, queries with high pairwise image similarity values can be grouped together into a image query cluster. In some examples, the server also determines a distance function for image each query cluster at block 414. The image query clusters and respective distance functions are associated with one another and stored for later use at block 416.

Figure 4B:
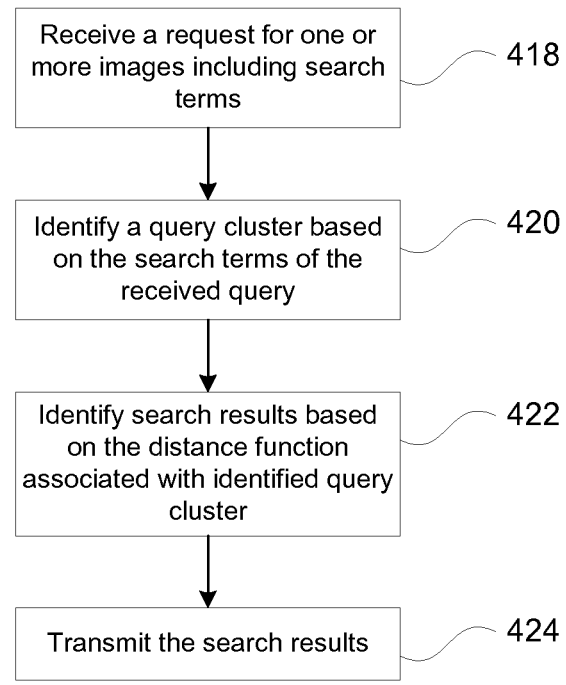

Flow diagram 400B of FIG. 4B is a further example of some of the aspects described above. The features and steps of FIG. 4B may be performed by the same or a different computer as those of FIG. 4B. For example, at block 418 of FIG. 4B, the server receives, from a client device, a request for one or more images including search terms. The server identifies an image query cluster based on the search terms of the received query at block 420. The server identifies search results based on the distance function associated with the identified query cluster at block 422. These search results are transmitted to the requesting client device for display to a user at block 424.

By utilizing image query clusters and query cluster specific distance functions, more relevant and interesting image results can be provided versus systems that use a single, generic distance function. This also cuts down on the amount of storage required if a distance function was determined for each possible query (one for "apple", one for "red apple", one for "tree", one for "green tree", etc.). For example, each distance function may require several hundred bytes of information making it very expensive to store each of these distance functions. Because the aspects described here include clustering queries, this dramatically reduces the amount of storage needed while still providing relevant, interesting, and helpful image results.

As these and other variations and combinations of the features discussed above can be utilized without departing from the subject matter defined by the claims, the foregoing description of the embodiments should be taken by way of illustration rather than by way of limitation of the subject matter defined by the claims. It will also be understood that the provision of the examples described herein, as well as clauses phrased as "such as," "including" and the like, should not be interpreted as limiting the subject matter to the specific examples; rather, the examples are intended to illustrate only one of many possible embodiments. Further, the same reference numbers in different drawings can identify the same or similar elements.

The invention claimed is:

1. A computer-implemented method comprising:
   obtaining a pair of search queries including (i) a first search query and (ii) a second search query;
   obtaining (i) a first set of multiple images that are identified as responsive to the first search query, and (ii) a second set of multiple images that are identified as responsive to the second search query;
   determining, for each pair of images that includes (i) a first image from the first set of multiple images that are identified as responsive to the first search query and (ii) a second image from the second set of multiple images that are identified as responsive to the second search query, an image distance between the first image of the pair and the second image of the pair based on information associated with one or more pixels of the first image of the pair and information associated with one or more corresponding pixels of the second image of the pair;
   determining a measure of similarity between (i) the first set of multiple images that are identified as responsive to the first search query and (ii) the second set of multiple images that are identified as responsive to the second search query, based at least on the respective image distances for each pair of images that includes (i) a first image from the first set of multiple images that are identified as responsive to the first search query and (ii) a second image from the second set of multiple images that are identified as responsive to the second search query;
   determining that the measure of similarity between (i) the first set of multiple images that are identified as responsive to the first search query and (ii) the second set of multiple images that are identified as responsive to the second search query satisfies a similarity threshold; and
   in response to determining that the measure of similarity between (i) the first set of multiple images that are identified as responsive to the first search query and (ii) the second set of multiple images that are identified as responsive to the second search query satisfies the similarity threshold, assigning the pair of search queries to a cluster of search queries.

2. The method of claim 1, wherein determining an image distance between the first image of the pair and the second image of the pair, comprises:
   determining the image distance based on comparing the first image of the pair and the second image of the pair at a pixel level.

3. The method of claim 1, comprising:
   generating a distance function associated with the cluster of search queries based on images that are identified as responsive to the search queries in the cluster of search queries.

4. The method of claim 3, wherein generating a distance function associated with the cluster of search queries based on images that are identified as responsive to the search queries in the cluster of search queries comprises:
   determining a reference image for the cluster of search queries from the images that are identified as responsive to the search queries in the cluster of search queries;
   determining a set of secondary images from the cluster of search queries from the images that are identified as responsive to the search queries in the cluster of search queries;
   determining a respective image distance between the reference image and each image of the set of secondary images; and
   determining the distance function associated with the cluster of search queries based on the determined image distances between the reference image and each image of the set of secondary images.

5. The method of claim 3, comprising:
   receiving a third search query;
   identifying the cluster of search queries as responsive to the third search query based on one or more search terms of the third search query; and
   identifying a set of search results based on the generated distance function associated with the cluster of search queries.

6. A system comprising:
   one or more computers and one or more storage devices storing instructions that are operable, when executed by the one or more computers, to cause the one or more computers to perform operations comprising:
   obtaining a pair of search queries including (i) a first search query and (ii) a second search query;
   obtaining (i) a first set of multiple images that are identified as responsive to the first search query, and (ii) a second set of multiple images that are identified as responsive to the second search query;
   determining, for each pair of images that includes (i) a first image from the first set of multiple images that are identified as responsive to the first search query and (ii) a second image from the second set of multiple images that are identified as responsive to the second search query, an image distance between the first image of the pair and the second image of the pair based on information associated with one or more pixels of the first image of the pair and information associated with one or more corresponding pixels of the second image of the pair;
   determining a measure of similarity between (i) the first set of multiple images that are identified as responsive to the first search query and (ii) the second set of multiple images that are identified as responsive to the second search query, based at least on the respective image distances for each pair of images that includes (i) a first image from the first set of multiple images that are identified as responsive to the first search query and (ii) a second image from the second set of multiple images that are identified as responsive to the second search query;

determining that the measure of similarity between (i) the first set of multiple images that are identified as responsive to the first search query and (ii) the second set of multiple images that are identified as responsive to the second search query satisfies a similarity threshold; and in response to determining that the measure of similarity between (i) the first set of multiple images that are identified as responsive to the first search query and (ii) the second set of multiple images that are identified as responsive to the second search query satisfies the similarity threshold, assigning the pair of search queries to a cluster of search queries.

7. The system of claim 6, wherein determining an image distance between the first image of the pair and the second image of the pair, comprises:

determining the image distance based on comparing the first image of the pair and the second image of the pair at a pixel level.

8. The system of claim 6, wherein the operations comprise:

generating a distance function associated with the cluster of search queries based on images that are identified as responsive to the search queries in the cluster of search queries.

9. The system of claim 8, wherein generating a distance function associated with the cluster of search queries based on images that are identified as responsive to the search queries in the cluster of search queries comprises:

determining a reference image for the cluster of search queries from the images that are identified as responsive to the search queries in the cluster of search queries;

determining a set of secondary images from the cluster of search queries from the images that are identified as responsive to the search queries in the cluster of search queries;

determining a respective image distance between the reference image and each image of the set of secondary images; and determining the distance function associated with the cluster of search queries based on the determined image distances between the reference image and each image of the set of secondary images.

10. The system of claim 8, wherein the operations comprise:

receiving a third search query;

identifying the cluster of search queries as responsive to the third search query based on one or more search terms of the third search query; and identifying a set of search results based on the generated distance function associated with the cluster of search queries.

11. A non-transitory computer-readable medium storing software comprising instructions executable by one or more computers which, upon such execution, cause the one or more computers to perform operations comprising obtaining a pair of search queries including (i) a first search query and (ii) a second search query;

obtaining (i) a first set of multiple images that are identified as responsive to the first search query, and (ii) a second set of multiple images that are identified as responsive to the second search query;

determining, for each pair of images that includes (i) a first image from the first set of multiple images that are identified as responsive to the first search query and (ii) a second image from the second set of multiple images that are identified as responsive to the second search query, an image distance between the first image of the pair and the second image of the pair based on information associated with one or more pixels of the first image of the pair and information associated with one or more corresponding pixels of the second image of the pair;

determining a measure of similarity between (i) the first set of multiple images that are identified as responsive to the first search query and (ii) the second set of multiple images that are identified as responsive to the second search query, based at least on the respective image distances for each pair of images that includes (i) a first image from the first set of multiple images that are identified as responsive to the first search query and (ii) a second image from the second set of multiple images that are identified as responsive to the second search query;

determining that the measure of similarity between (i) the first set of multiple images that are identified as responsive to the first search query and (ii) the second set of multiple images that are identified as responsive to the second search query satisfies a similarity threshold; and in response to determining that the measure of similarity between (i) the first set of multiple images that are identified as responsive to the first search query and (ii) the second set of multiple images that are identified as responsive to the second search query satisfies the similarity threshold, assigning the pair of search queries to a cluster of search queries.

12. The computer-readable medium of claim 11, wherein determining an image distance between the first image of the pair and the second image of the pair, comprises:

determining the image distance based on comparing the first image of the pair and the second image of the pair at a pixel level.

13. The computer-readable medium of claim 11, wherein the operations comprise:

generating a distance function associated with the cluster of search queries based on images that are identified as responsive to the search queries in the cluster of search queries.

14. The computer-readable medium of claim 13, wherein generating a distance function associated with the cluster of search queries based on images that are identified as responsive to the search queries in the cluster of search queries comprises:

determining a reference image for the cluster of search queries from the images that are identified as responsive to the search queries in the cluster of search queries;

determining a set of secondary images from the cluster of search queries from the images that are identified as responsive to the search queries in the cluster of search queries;

determining a respective image distance between the reference image and each image of the set of secondary images; and determining the distance function associated with the cluster of search queries based on the determined image distances between the reference image and each image of the set of secondary images.

* * * * *